United States Patent [19]

Kah, Jr.

[11] Patent Number: 5,709,370
[45] Date of Patent: Jan. 20, 1998

[54] MAGNETICALLY ACTUATED VALVE

[76] Inventor: Carl L. C. Kah, Jr., 778 Lakeview Dr., North Palm Beach, Fla. 33408

[21] Appl. No.: 419,133

[22] Filed: Apr. 10, 1995

[51] Int. Cl.$^6$ ................................ F16K 31/06
[52] U.S. Cl. ..................... 251/129.15; 251/129.19
[58] Field of Search ............... 251/129.15, 129.2, 251/65, 30.01, 129.19; 137/596.17, 625.64, 625.65

[56] References Cited

U.S. PATENT DOCUMENTS

| | | | |
|---|---|---|---|
| 3,295,079 | 12/1966 | Brown | 251/129.19 X |
| 3,921,670 | 11/1975 | Clippard, Jr. et al. | 251/129.15 X |
| 4,250,924 | 2/1981 | Sakakibara et al. | 251/129.2 X |
| 4,534,381 | 8/1985 | Hozumi et al. | 251/129.2 X |
| 4,848,727 | 7/1989 | Nanbu et al. | 251/129.19 X |
| 5,020,774 | 6/1991 | Christianson | 251/129.15 |
| 5,139,226 | 8/1992 | Baldwin et al. | 137/625.65 X |

*Primary Examiner*—Kevin Lee
*Attorney, Agent, or Firm*—Jack N. McCarthy

[57] ABSTRACT

An alternating electric current integral pilot valve actuator and pilot valve. The magnetic flux core of the actuator is a short flux path through a "U" shaped magnetic material piece providing two pole pieces for a magnetic material valve member to be pulled against the two pole pieces which then completes the magnetic flux path, opens an integral pilot valve port and reduces the coil current to a lower level.

33 Claims, 5 Drawing Sheets

MAGNETICALLY ACTUATED VALVE

BACKGROUND OF THE INVENTION

Small pilot valves of the type disclosed in this application are currently being operated by solenoid-type magnetic coils where a plunger is pulled against a pole piece inside the coil. A valve of this type is shown in U.S. Pat. No. 3,598,360. In these solenoid configuration actuators there are two air gaps at the time of actuation; one between the end of the plunger and the pull-in pole piece and one along the sides of the plunger to the other coil pole to allow for the plunger to move which is never eliminated even after actuation.

In my U.S. Pat. No. 4,310,023 a magnetically actuated pilot valve is shown where a valve member and magnetically moveable member is pulled against two electrically magnetically energizable pole pieces. No provision was disclosed for optimizing the actuator for alternating current operation. Also an easily manufacturable actuator configuration with minimum flux path length and having an integral pilot valve was not disclosed.

SUMMARY OF THE INVENTION

A primary object of this invention is to provide a simple, low cost of manufacture, high efficiency actuator using alternating current for pilot valves for larger flow control valves such as disclosed in my patent application Ser. No. 08/279,326.

The pilot valve magnetic actuator disclosed has unique construction features for providing a simple, low manufacturing cost, high efficiency configuration.

The flux core of the electrical copper coil can be manufactured from a bar of 400 series stainless steel having a rectangular cross-section, and the stationary and moving core pieces can be manufactured of the same bar material by a fast, and low cost progressive stamping process. The parts can then be passivated to remove the surface iron molecules to provide corrosion resistant smooth surfaces where they are exposed and interact with each other.

The fact that the moving core piece (armature) is configured to touch the one pole piece prior to actuation minimizes the air gap in the core flux path prior to the coil being energized and thus maximizes the pull force on the moving core piece per ampere turn of coil winding.

Once the moving core piece is moved by an alternating current to open the pilot valve port it is in complete contact with both poles of the stationary magnetic flux core to provide a totally closed loop magnetic flux path, no air gap. This provides a maximum back impedance to alternating current for the electrical copper coil and causes the holding current to drop to a lower current level, reducing the coil's resistive heating caused by the holding current.

Minimizing the heating of the coil is important for having a long coil life since it reduces the extent of the thermal cycling between metal and plastic components in the pilot valve actuator which could otherwise eventually cause fatigue between material interfaces and cracks. Moisture can then be pulled into the coil by thermal pumping causing eventual shorting and failure of the actuator's electrical coil which is presently the major cause of pilot valve solenoid actuator failure for the irrigation industry.

In the disclosed actuator configuration the electrical coil can be easily encapsulated by molding to provide complete moisture protection and separation of the coil from the metal parts and can also serve as the actuator housing.

Low actuator holding current is also a marketable feature since more actuators can be operated simultaneously if desired with the same size controller transformer.

Since one side of the moving core piece (armature) is spring loaded into contact with the one pole piece no pole shading is required for this pole piece to eliminate buzzing during alternating current operation. This also provides one of the important features of the unique disclosed configuration since this also eliminated the air gap for this pole piece to the moving core piece to provide a greater pull in force for the valving member for the same coil current or reduce the coil's required in rush current.

A configuration is disclosed that eliminates the need for pole shading to further reduce manufacturing costs.

The pilot valve is housed in the actuator housing as an assembly which also has an integral filter to prevent dirt of significant size from getting up into the pilot valve area even when this pilot valve actuator may be disassembled from the main valve housing in a valve box down in the ground that may fill with dirty water during maintenance. It also protects the small openings of the pilot valve and valving member during normal valve operation.

Another benefit of the combination actuator pilot valve configuration is that the pilot valve, valve member and valve seat member assembly can be easily disassembled for inspection away from a dirty environment.

Having the pilot valve assembly in the actuator housing puts all of the actuation gap movement tolerance in the control of the actuator manufacturer.

The two pole configuration lends itself to having a second valve port between the poles which can be shut off when the actuator is energized and the first valve port is opened. This is important for pilot valve control of larger flow control valves in dirty water (well or ditch water) operation since it can be used to shut off the control chamber's pressurizing water source during the time the pilot valve dump port is venting the control chamber.

Several of the configurations of a two pole actuator and moving core have the added advantage of a mechanical lever arm with the pivot action of the moving core helping to lift the pilot valve off of its seat against the pressure area load since the pulling pole is further away from the pivot part of the moving core than the pilot valve port opening.

This lever arm advantage also helps in closing the second valve port against its pressure. The two pole actuator configuration also makes it easy to internally connect a pressurizing source to the second port pilot valve actuator through the same threaded actuator attachment.

A very important feature of the unique U-shaped two pole actuator shown is that a minimum magnetic flux path length is obtained with both poles being accessible for the moving actuator core piece in a small diameter attachment threaded boss that allows this high performance, low cost to manufacture, pilot valve actuator to be used in the replacement market as well as for new valves.

DESCRIPTION OF THE PREFERRED EMBODIMENT

Figure 1:
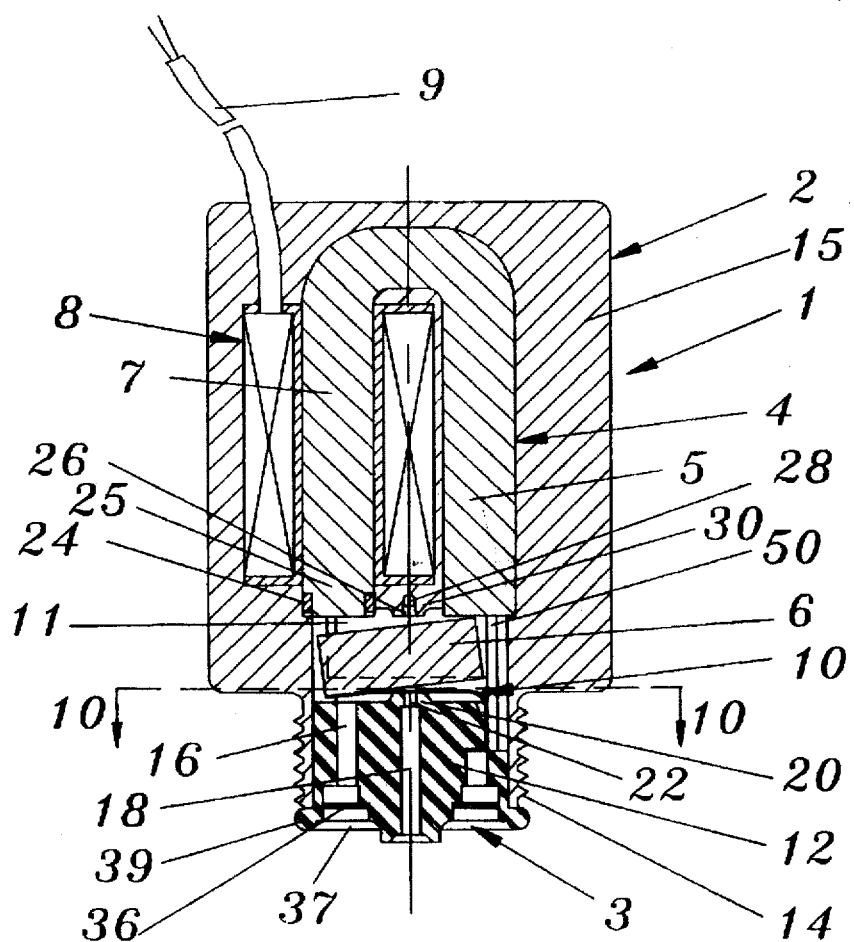
FIG. 1 is a sectional side elevational view of the magnetically actuated pilot valve showing the magnetic actuator and its integrally mated pilot valve assembly.
Figure 2:
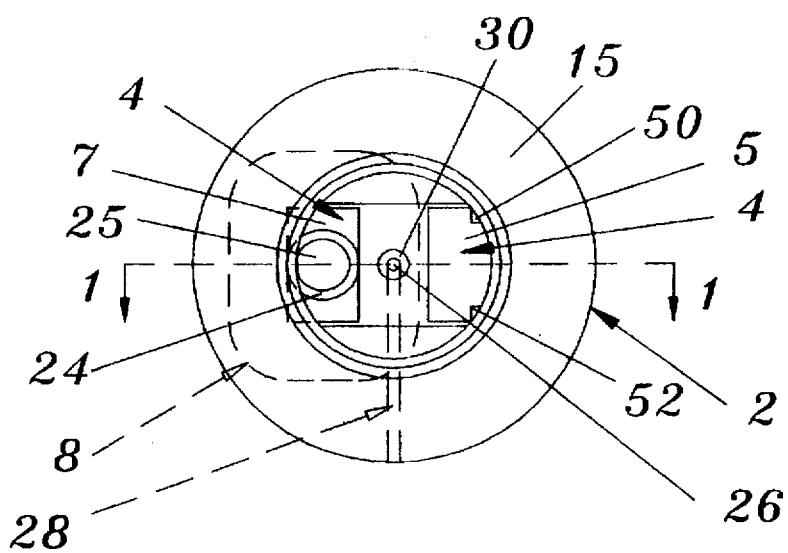
FIG. 2 is a bottom view of the magnetic actuator of FIG. 1 with the pilot valve assembly removed showing its two pole pieces.

As seen in FIG. 1 and FIG. 2 a magnetically actuated pilot valve assembly 1 is formed having a magnetic actuator 2 including (1) a housing 15 enclosing a coil 8 and magnetic flux core 4 and (2) a pilot valve assembly 3. In some constructions the coil 8 and magnetic flux core 4 are contained in an injection molded housing 15. The magnetic flux core 4 is formed as a U-shape having two legs 5 and 7. The leg 7 of the U-shaped magnetic flux core 4 extends through the coil 8. Said housing 15 has an opening 11 extending from the exterior of said housing 15 directly to the ends of the legs 5 and 7 of the magnetic flux core 4. The pilot valve assembly 3 comprises three (3) main parts: A. a pilot valve body 12 B. a pilot valve closure member 10 and C. a moveable core piece 6, (see FIGS. 6, 7 and 10).

The pilot valve body 12 is cylindrical and has a press friction fit into the lower part of opening 11 which is cylindrical. Said pilot valve body 12 includes a valve seat 20 with an opening, or port, 22 connected to a short exit passage 18 extending through said pilot valve body 12. A second short inlet passage 16 extends through said pilot valve body 12 to an annular collection groove 37. This annular collection groove 37 has an annular filter 36 for fluid entering inlet passage 16. An annular step supports the inner edge of the annular filter 36.

Figures 6, 7:
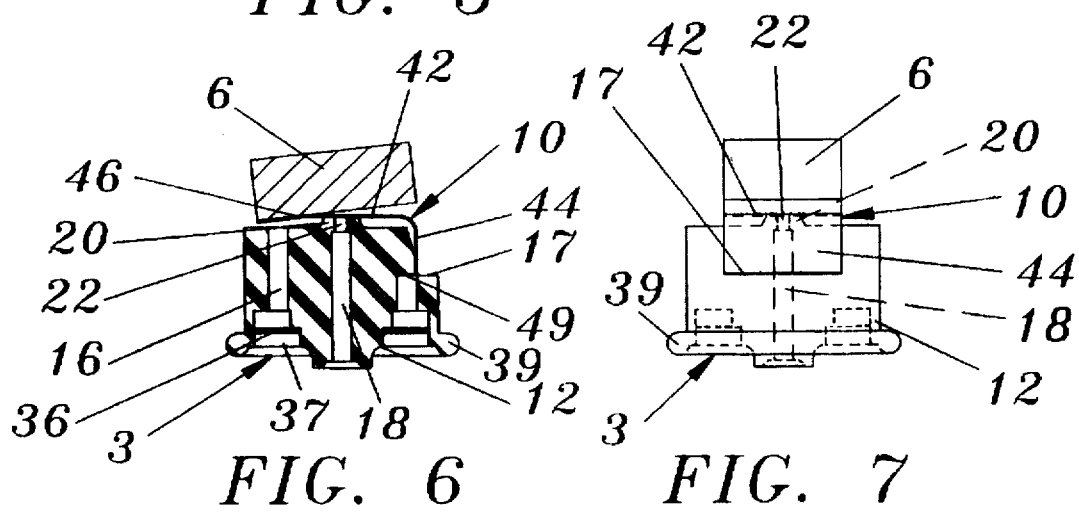
FIG. 6 is a sectional side elevational view of the pilot valve assembly removed from the magnetic actuator.
FIG. 7 is a side view of the pilot valve assembly taken from the right side of FIG. 6.

As shown in FIG. 6 the pilot valve closure member 10 is formed as a leaf spring part 42 for covering the opening, or port, 22 of the raised valve seat 20. The pilot valve body 12 is constructed to hold one turned down end portion 44 of the leaf spring part 42 to place the leaf spring part 42 in a valve closed position when assembled, to fix this positioning, two ribs 50 and 52 are formed on the inside of the opening 11 to engage the outside of the turned down portion, or flange, 44 when the pilot valve body 12 is pressed into the opening 11. The one end 44 is turned downwardly at an angle of approximately 90 degrees to be received in a notch 17 in the pilot valve body 12 to be properly positioned for holding the leaf spring part 42 on the valve seat 20, closing opening, or port, 22. The bottom of the turned down portion, or flange, 44 is turned inwardly at 49 to fit in a slot in the pilot valve body 12.

The moveable core piece 6 is connected at one end to the free end 46 of the leaf spring part 42 to provide valve actuation, with a hinge action being provided between the leaf spring part 42 and fixed flange 44. The moveable core piece 6 is a short bar of the material forming the magnetic flux core 4. The free end 46 of the leaf spring part 42 is angled slightly downwardly on the line A to receive one end of the core piece, or short bar, 6 which is affixed by welding, or some other known means. This construction angles the core piece, or short bar, 6 upwardly from the top of the pilot vane body 12, so that as the pilot valve body 12 and leaf spring part 42 with the core piece 6 attached, is pressed into its operating position the raised end of the core piece, or short bar, 6 will contact the leg 5 of the U-shaped magnetic flux core 4 and be spring loaded into continuous contact. This arrangement can accommodate manufacturing fitting tolerances when being assembled while maintaining contact between the core piece 6 and leg 5 without unseating the pilot valve. Leg 7 has a pole shading ring 24 around a circular projection 25 on the leg 7. The lower part of the housing 15 is formed with external threads 14 to be attached to a device where a magnetically actuated pilot valve 1 is to be used (see FIG. 5).

The pilot valve body 12 can be made of an elastomeric material with an integral bead 39 molded around the bottom thereof to provide a seal between the housing 15 and any device that it is threaded to. A small notch is provided in the pilot valve body 12 under the pilot valve closure member 10 where flange 44 turns downwardly so as not to adversely affect movement of any spring action occurring when the coil 8 is energized.

For alternating current operation the end of pole pieces that are not held in continuous contact with the moving core piece must have a pole shading feature added to prevent having the moving core piece buzzing as the moving core piece may be moved away from the pole piece when the coil current goes through zero current during the alternating current flow reversal, i.e. 60 Hz.

This is accomplished by cutting a groove in the end of the pole piece and placing a copper, conducting piece into this groove. As the magnetic field lines of force collapse as the coil current drops to zero these collapsing magnetic lines of force cut through the copper piece inducing a current into this piece which is at a maximum at the time the coil current is going through zero causing the pole piece on each side of the copper insert to be opposite poles of a small magnet that completes its attraction magnetic flux path through the moving core piece holding it in place during the time that the coil current would not have been holding the moving core piece in place.

The configuration of the two pole pieces 5 and 7 in a U-shape lends itself to having a raised valve seat 30 with a second pilot valve port 26 between the two pole pieces 5 and 7 which can be shut off when the coil 8 is energized opening port 22 and the moving core piece 6, which is already spring loaded int contact with pole piece 5 pulled up into contact with both of the two pole pieces 5 and 7 to cover the second pilot valve port 26 of the raised valve seat 30. This second pilot valve port 26 can be connected to an outside source of pressure if desired through connecting passage 28.

Figure 3:
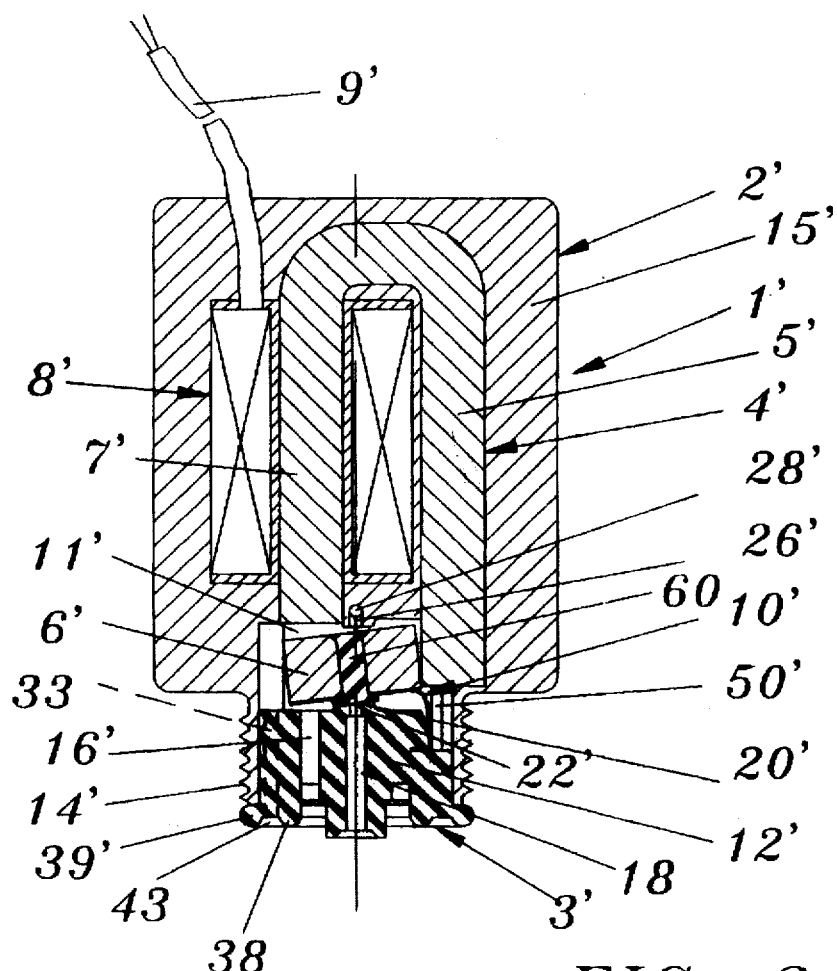
FIG. 3 is a sectional side elevational view of an alternate configuration of the magnetically actuated pilot valve showing how the moving core interacts with the one extended stationary pole piece.
Figure 4:
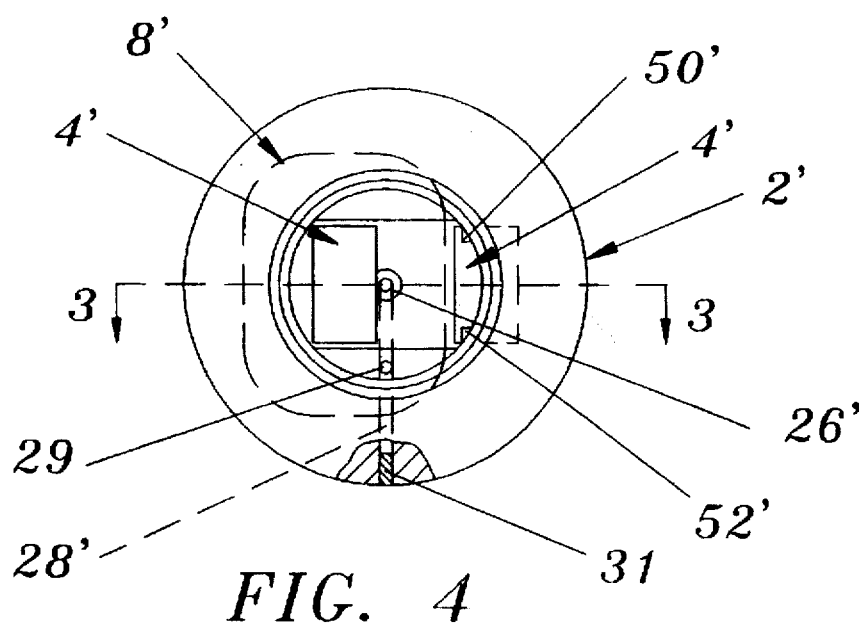
FIG. 4 is a bottom view of the alternate magnetic actuator of FIG. 3 with the pilot valve assembly removed showing its two pole pieces.

As seen in FIG. 3 and FIG. 4 the magnetically actuated pilot valve assembly 1' is formed having a magnetic actuator 2' including (1) a housing 15' enclosing a coil 8' and magnetic flux core 4' and (2) a pilot valve assembly 3'. The magnetic flux core 4' is formed as a U-shape having two legs 5' and 7'. The leg 7' is a short leg and extends through the coil 8'. The leg 5 is a longer leg. Said housing 15' has an opening 11' extending from the exterior of said housing 15' directly to contain exposed portions of legs 5' and 7' of the magnetic flux core 4', the bottom of leg 7' and the inner side of the extended part of leg 5'. A pilot valve assembly 3' comprises three (3) main parts, A a pilot valve body 12', B a combined pilot valve closure member 60, and moveable core piece 6', and C a bias, or spring 10', for pivotally mounting said moveable core piece 6' and pilot valve closure member 60.

The pilot valve body 12' is cylindrical and has a friction fit in the lower part of opening 11' which is cylindrical and includes a valve seat 20' with an opening 22' connected to a short exit passage 18' extending through said pilot valve body 12'. The lower part of the housing 15' is formed with external threads 14' to be attached where the magnetically actuated pilot valve 1' is to be used (see FIG. 5).

Figure 10:
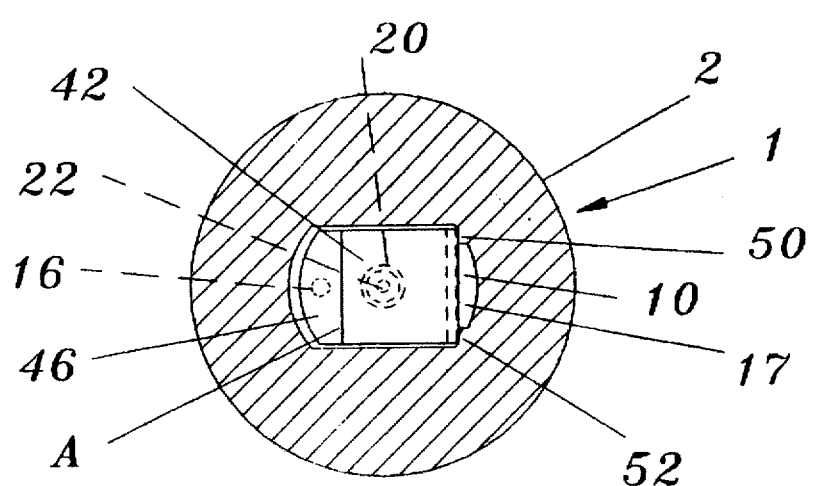
FIG. 10 is a view taken along the line 10—10 of FIG. 1 with the moving core removed.

As referred to above, the pilot valve assembly 3' is similar to pilot valve assembly 3 of FIG. 1, (see FIGS. 6, 7 and 10). The main difference being the length of the pilot valve closure member 10 and spring 10' and length of the moveable core piece 6, and 6', shortened to accommodate seating against the side of extended leg 5'.

In FIG. 3 a second pilot valve port 26' is provided with a raised seat between the pole pieces 5' and 7' which can be shut off when the coil 8' is energized to open port 22'. The moving core piece 6' has a protruding lower end of the built-in pilot valve closure member 60 positioned to engage the raised valve seat 20' in the normal position of the spring 10' to close the opening 22'. This protruding lower end passes through the spring 10' and has a flange to attach the moveable core piece 6' to the spring 10' This requires a slight angle on the top of the raised valve seat 20' to properly seat with the bottom of the closure member 60. The spring 10' is held fixed to the pilot valve body 12' in the same manner as pilot valve closure member 10 of FIG. 1. In this normal position of the spring 10' the lower edge of the moving core piece 6' is biased against the side of the extended part of leg 5'.

When the coil 8' is energized, the combined pilot valve closure member 60 and moveable core piece 6' is pulled up towards pole piece 7', and an upper end of the built-in pilot valve closure member 60 engages the raised valve seat around the second valve port 26' to cover it. This second pilot valve port 26' can be connected to an outside source of pressure if desired through connecting passage 28'. However, passage 28' can be blocked to the outside by an insert 31 and connected to an internal passage 29 to pass downwardly through the housing 15' to a passage 33 (shown in phantom by dotted lines in FIG. 3 since the passage 33 is actually at the rear of FIG. 3 to mate with the bottom end of passage 29) in the pilot valve body 12' to a circular groove 43 on the bottom of the periphery of the valve body 12' between circular bead 39' and a circular bead 38 located inwardly of bead 39'. This circular groove 43 can be connected to an internal passage in a housing of a large flow control valve 100 which is connected to the pressurized fluid inlet (not shown).

This internal passage arrangement brings all of the fluid connections for the magnetically actuated pilot valve assembly 1' to the bottom of the actuator housing 15' at its threaded attachment connection so that no separate external fluid connections are required when attached to a larger valve housing 100 having all three passage connections available at the boss to receive the magnetic actuator 2'.

No pole shading is shown on pole piece 7' of FIG. 3 which reduces the manufacturing cost of machining the groove on the end of pole piece 7' and installing the copper conducting ring as well as polishing of the end of pole piece 7'. The raised valve seat around the second valve port 26' projects outwardly so moveable core piece 6' does not make mechanical contact with the pole piece 7' when the coil 8 is electrically energized pulling the moveable core piece 6' up with its elastomeric pilot valve closure member 60 touching the raised valve seat around the pilot valve port 26'. The weight of the moveable pole piece 6' in combination with the force of the leaf spring 10' is sized to avoid being responsive to movement at 50 or 60 Hz, the alternating frequency of the A.C. current in coil 8'. Some movement of the moveable core piece 6' occurs as the polarity of the pole pieces 5' and 7' go through zero and reverse in response to the alternating current. The impact of the small resulting movement of the moveable core piece 6' is not felt against pole piece 7' but is absorbed and damped in the elastomeric pilot valve closure member 60 by the engagement with the raised valve seat around pilot valve port 26'.

Figure 5:
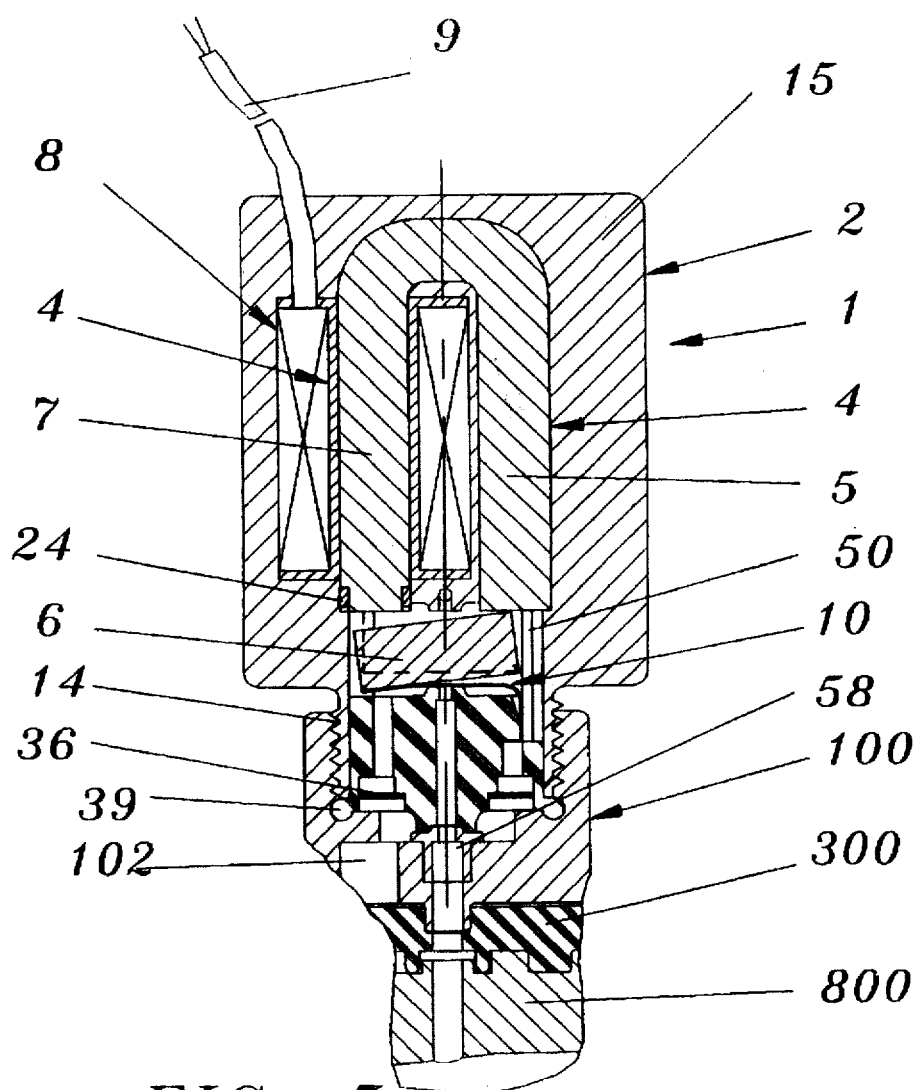
FIG. 5 is a cross sectional view of a magnetically actuated pilot valve mated to a typical larger flow control valve housing.

FIG. 5 shows the magnetically actuated pilot valve 1 of FIG. 1 mated to a large flow control valve 200 needing a pilot valve control. Such a large flow control valve is shown in my patent application Ser. No. 08/279,326 filed Jul. 22, 1994 for a Tilted Seat Diaphragm Valve whose subject matter is included as filed with this application. Passage 102 goes to a control chamber; 200 is a diaphragm; and 800 is the body outlet.

Figure 8:
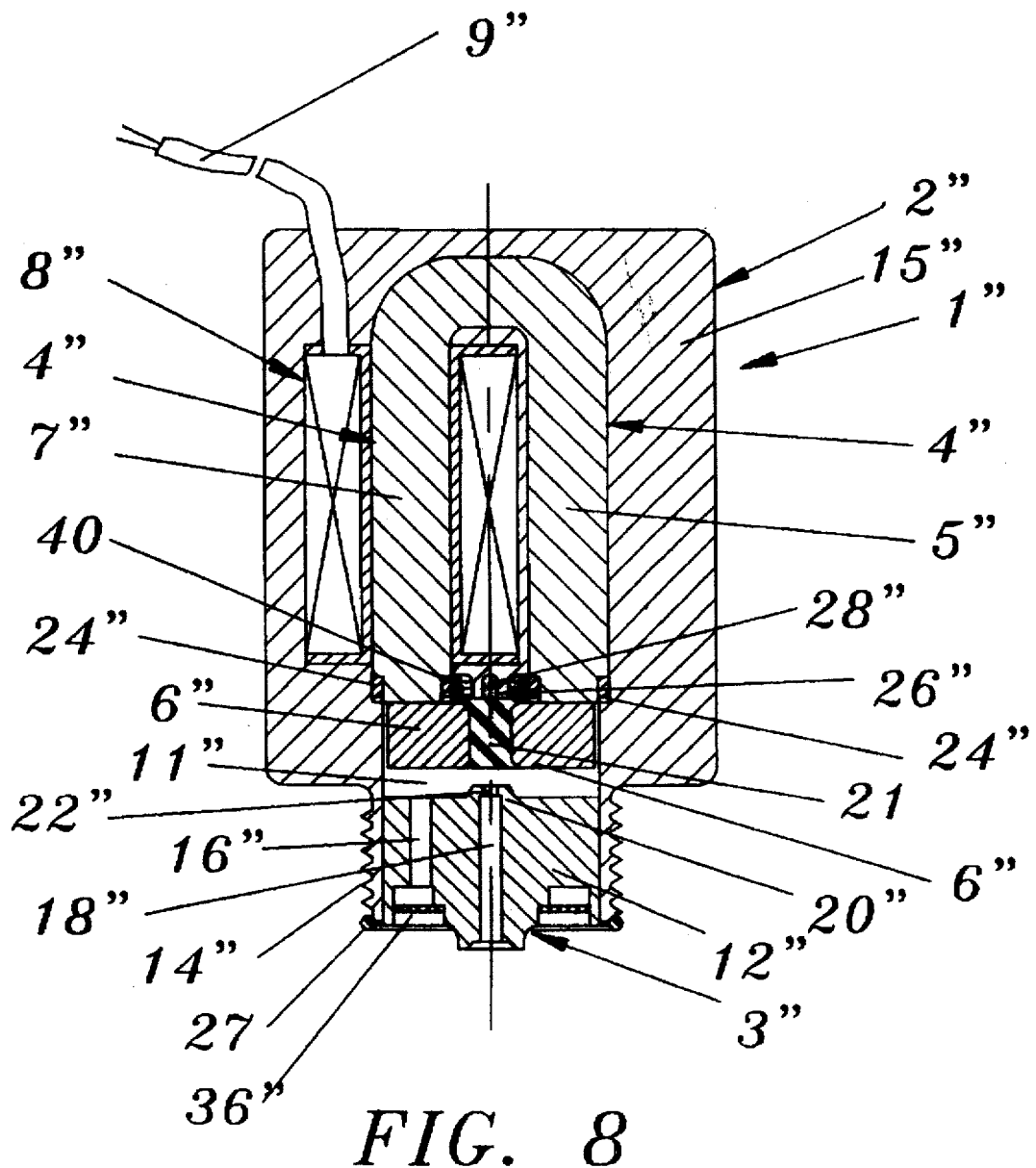
FIG. 8 is a sectional side elevational view of a second alternate configuration of an energized magnetically actuated pilot valve showing a modified moving core having a valve member moved in one direction by an actuated coil and spring biased in the opposite direction.

The second alternate configuration in FIG. 8 of the magnetically actuated pilot valve 1" includes a magnetic actuator 2" having a housing 15" enclosing a coil 8"and magnetic flux core 4", and a pilot valve assembly 3" FIG. 8 is shown in the energized position with the moveable core piece 6" engaging the ends of both legs 5" and 7" making a complete flux path, with no "air gap". The magnetic flux core 4" is formed, as in FIG. 1, as a U-shape having two equal length legs 5" and 7"with leg 7" extending through the coil 8". Said housing 15" has an opening 11" extending from the exterior of said housing 15" directly to the ends of the legs 5" and 7". The pilot valve assembly 3" comprises two (2) main parts, A a pilot body 12" and B a combined moveable core piece 6" and pilot valve closure member 21.

The pilot valve body 12" is cylindrical and has a friction fit in the lower part of the opening 11" which is cylindrical and includes a valve seat 20" with an opening 22" connected to a short exit passage 18" extending through said pilot valve body 12". The combined moveable core piece 6" and pilot valve closure member 21 is positioned in the top portion of the opening 11" between the ends of the legs 5" and 7" and the top of the pilot valve body 12" and biased by a coil spring 40 towards a closed position against valve seat 20". Core piece 6" is loose fitted into opening 11" to allow axial movement of core piece 6" and to permit flow from second pilot valve port 26" down over the side of core piece 6" to the control passages below for operation. The lower part of the housing 15" is formed with external threads 14". Legs 5" and 7" each have a pole shading ring 24" around a circular projection at the end of each leg 5" and 7".

As before, the configuration of the two pole pieces 5" and 7" in a U-shape lends itself to having a raised valve seat with a second pilot valve port 26" between the two pole pieces 5" and 7" which can be shut off when the coil 8" is energized opening port 22" and the moving core piece 6" pulled up into contact with the two pole pieces 5" and 7" against the coil spring 40 located around the raised valve seat and second pilot valve port 26". The pilot valve closure member 21 engages the raised valve seat closing the second pilot valve port 26" when the legs 5" and 7" are forming a complete flux path with core piece 6". Pilot valve closure member 21 can be made of elastomeric material to achieve good sealing. The second pilot valve port 26" can be connected to an outside source of pressure if desired through connecting passage 28" as discussed herein before. A feature of this configuration is that both pole pieces 5" and 7" are exposed to pull the moveable core piece 6" in the direction of its desired movement. The moveable core piece 6" completes the opening of the port 22" and contacts both of the pole pieces 5" and 7" to complete the magnetic flux path with no air gap. This action of the completed magnetic flux path provides a maximum electrical coil 8" impedance to alternating current flow for this coil configuration.

Figure 9:
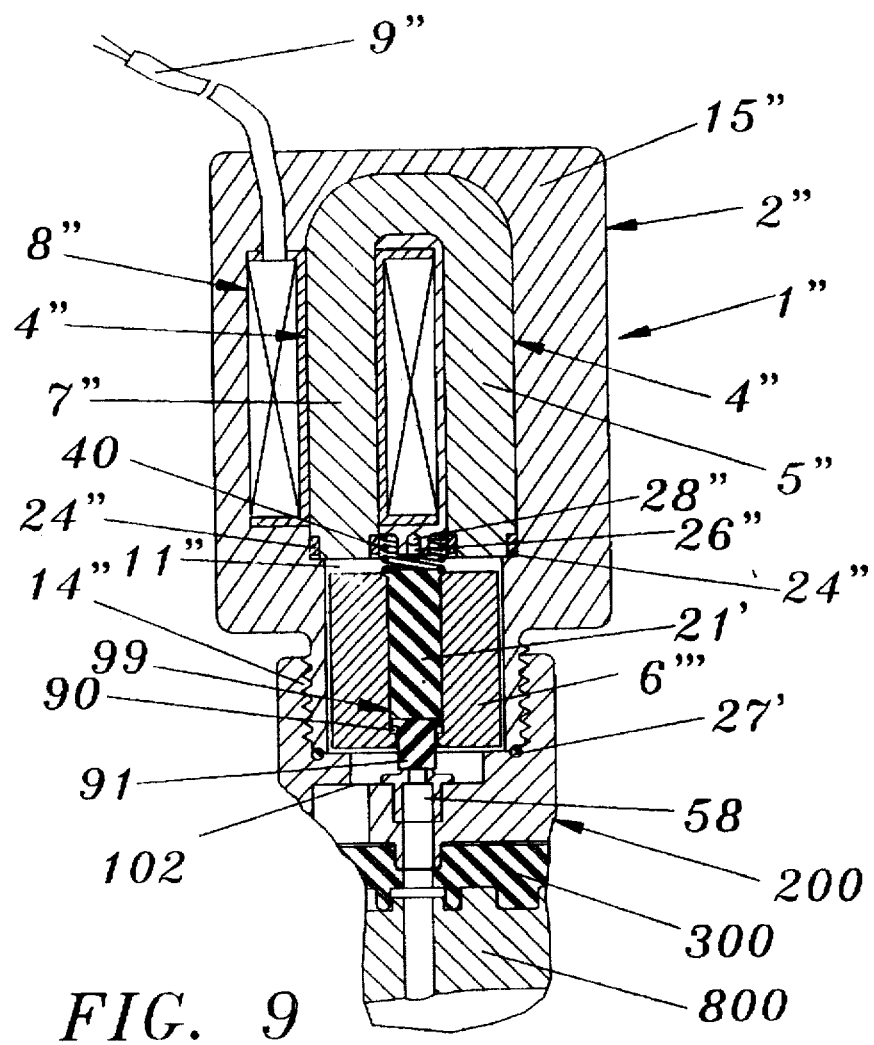
FIG. 9 is a sectional side elevational view of a third alternate configuration of a magnetic actuator showing a moving core for use with a separate valve seat.

The third alternate configuration in FIG. 9 of the magnetically actuated pilot valve 1'" includes a magnetic actuator 2'" having a housing 15" enclosing a coil 8" and magnetic flux core 4", and a combined moveable core piece 6'" and a pilot valve closure member 99 formed of two pies, a fixed top piece 21' and a moveable bottom piece 91, having a limited "lost motion" connection to be later described.

The magnetic flux core 4" is formed, as in FIG. 8, as a U-shape having two equal length legs 5" and 7", with leg 7" extending through the coil 8". Said housing 15" has an opening 11" extending from the exterior of said housing 15" directly to the ends of the legs 5" and 7". FIG. 9 is shown in an unenergized position with the magnetic actuator 2'" installed in a large flow control valve 100 to control it. The moveable core piece 6'" is biased downwardly by coil spring 40.

The pilot valve closure member 99 which is formed of a top fixed piece 21' and bottom moveable piece 91 is positioned through the center of the moveable core piece 6'". The top fixed piece 21' of the pilot valve closure member 99 is positioned to engage the valve seat around pilot valve port 26" as the moveable core piece 6'" is pulled up into contact with the two pole pieces 5" and 7" forming a complete flux path. The top fixed piece 21' of the pilot valve closure member 99 extends downwardly to a lower portion of the core piece 6'".

An opening 90 is provided in the lower portion of the moveable core piece 6'" from just below the top fixed piece 21' to a point just short of the bottom of the moveable core piece 6'". A hole extends from said opening 90 through the bottom of said moveable core piece 6'". The bottom moveable piece 91 of the pilot valve closure member 99 has an enlarged head in opening 90 and its actuating portion extends through the hole from opening 90 below the moveable core piece 6'" to engage a valve seat. This movement of the enlarged head of bottom moveable piece 91 in opening 90 provides a "lost motion" connection between the movement of core piece 6'" and bottom moveable piece 91.

As in FIG. 8, both pole pieces 5" and 7" are magnetically pulling, when the coil 8" is energized, on the moveable core piece 6'" in the desired direction of movement of the moveable core piece 6'" to open the bottom moveable piece 91 of pilot valve closure member 99 against the pressure area force trying to hold the bottom moveable piece 91 closed. The "lost motion" connection is shown between the bottom moveable piece 91 and the moveable core piece 6'" so that moveable core piece 6'" is already moving towards the magnetic pole pieces 5" and 7" when it picks up bottom moveable piece 91 and encounters the resistance of the pressure area force on bottom moveable piece 91 trying to hold it in the closed position against the valve seat 58. Thus the inertia of the moving core piece 6'" aids the pull force of the magnetic pole pieces 5" and 7" to unseat the bottom moveable piece 91, of the pilot valve closure member 99, from its seat 58 during pilot valve opening. This can allow a lower ampere turn actuation coil to open the pilot port.

While the principles of this invention have now been made clear in illustrative embodiments, it will become obvious to those skilled in the art that many modifications in arrangement are possible without departing from those principles. The appended claims are therefore intended to cover and embrace any such modifications, within the limits of the true spirit and scope of the invention.

I claim:

1. A magnetically actuated valve including a housing, said housing having an electric coil, a magnetic flux core extending through the coil, said magnetic flux core having two core ends, said housing having an elongated opening extending outwardly from said two core ends, an insertable valve body with a press fit in said elongated opening spaced from said two core ends, an exit passage and an inlet passage extending through said valve body, a cooperating valve closure member positioned in said opening below said two core ends, core piece being attached to said valve closure member for moving said valve closure member to an open position, said magnetic flux core is U-shaped, said moveable core piece having two end faces, and said U-shaped magnetic flux core has one side of said U-shape longer than the other to be engaged by one end face of said moveable core piece when said moveable core piece is against said U-shaped magnetic flux core.

2. A magnetically actuated valve including a housing, said housing having an electric coil, a magnetic flux core extending through the coil, said magnetic flux core having two core ends, said housing having an elongated opening extending outwardly from said two core ends, an insertable valve body with a press fit in said elongated opening spaced from said two core ends, an exit passage and an inlet passage extending through said valve body, a cooperating valve closure member positioned in said opening below said two core ends, a moveable core piece located in said opening, said moveable core piece being attached to said valve closure member for moving said valve closure member to an open position, said two core ends have a space therebetween, said exit passage in said valve body being aligned with the space between said two core ends.

3. A magnetically actuated valve including a housing, said housing having an electric coil, a magnetic flux core extending through the coil, said magnetic flux core having two core ends, said housing having an elongated opening extending outwardly from said two core ends, an insertable valve body with a press fit in said elongated opening spaced from said two core ends, an exit passage and an inlet passage extending through said valve body, a cooperating valve closure member positioned in said opening below said two core ends, a moveable core piece located in said opening, said moveable core piece being attached to said valve closure member for moving said valve closure member to an open position, an annular collection groove is in the bottom surface of the valve body around said exit passage, said inlet passage being connected to said collection groove for receiving a fluid entering said magnetically actuated valve.

4. A magnetically actuated valve as set forth in claim 3 wherein the lower part of said elongated opening is cylindrical, and said insertable valve body is cylindrical, the upper part of said elongated opening being shaped to receive said moveable core piece.

5. A magnetically actuated valve as set forth in claim 3 wherein spring means biases said valve closure member to a closed position to prevent flow into said exit passage.

6. A magnetic actuator for a valve assembly including a housing, said housing enclosing an electric coil and a magnetic flux core, said magnetic flux core being U-shaped and having two spaced legs, each leg having a core end, said core ends being spaced apart, said housing completely encapsulating said electric coil for moisture protection and extending between the two spaced legs, said encapsulating housing having a projection extending from said housing, said projection having means for attachment to a device, said housing having an opening extending through said projection from the exterior of said housing to adjacent the two spaced core ends of the flux core, said opening containing a valve assembly, said valve assembly having a valve body positioned in said opening spaced from said two spaced core ends forming an enclosed opening, said valve body having an exit passage and an inlet passage extending therethrough to said enclosed opening, a valve closure member in said enclosed opening is biased to close said exit passage and a moveable core piece in said enclosed opening is connected to said valve closure member for acting on said valve closure member to open said exit passage when said moveable core piece is drawn to said magnetic flux core.

7. A magnetic actuator as set forth in claim 6 wherein said U-shaped magnetic flux core is formed from a bar of magnetic material, said moveable core piece being formed of a bar of magnetic material with the same cross-section as the U-shaped magnetic flux core.

8. A magnetic actuator for a valve assembly including a housing, said housing enclosing an electric coil and a magnetic flux core, said magnetic flux core being U-shaped and having two spaced legs, each leg having a core end, said core ends being spaced apart, said U-shape having a continuous length, said housing completely encapsulating said electric coil for moisture protection and extending between the two spaced legs, said housing having a projection extending from said housing, said projection having means for attachment to a device, said housing having an opening extending through said projection directly to below the two spaced core ends of the flux core for receiving a valve assembly, said valve assembly having a valve body positioned in said opening spaced from said two spaced core ends, said valve body having an exit passage and an inlet passage extending therethrough to said opening, a valve closure member biased to close said exit passage and a moveable core piece connected to said valve closure member for acting on said valve closure member to open said exit passage when said moveable core piece is drawn to said magnetic flux core, said U-shaped magnetic flux core has one side of said U-shape longer than the other.

9. A magnetic actuator for a valve assembly including a housing, said housing enclosing an electric coil and a magnetic flux core, said magnetic flux core being U-shaped and having two space legs, each leg having a core end, said core ends being spaced apart, said housing completely encapsulating in said electric coil for moisture protection and extending between the two spaced legs, said housing having a projection extending from said housing, said projection having means for attachment to a device, said housing having an opening extending through said projection directly to below the two spaced core ends of the flux core for receiving a valve assembly, said valve assembly having a valve body positioned in said opening spaced from said two spaced core ends, said valve body having an exit passage and an inlet passage extending therethrough to said opening, a valve closure member biased to close said exit passage and a moveable core piece connected to said valve closure member for act in on said valve closure member to open said exit passage when said moveable core piece is drawn to said magnetic flux core, said exit passage is aligned with the housing extending between the two spaced legs, said housing having an inlet passage, said housing inlet passage being connected to said opening, said housing inlet passage entering said opening in the housing extending between the two spaced legs.

10. A magnetic actuator as set forth in claim 9 wherein said entrance of said housing inlet passage to said opening is aligned with said exit passage, said housing inlet passage being closed when said moveable core piece is drawn to said magnetic flux core opening said exit passage.

11. A magnetic actuator as set forth in claim 9 wherein said valve closure member is also positioned to cooperate with said housing inlet passage to close said housing inlet passage when said exit passage is opened.

12. A magnetic actuator for a valve assembly including a housing, said housing enclosing an electric coil and a magnetic flux core, said magnetic flux core being U-shaped and having two spaced legs, each leg having a core end, said core ends being spaced apart, said U-shape having a continuous length, said housing completely encapsulating said electric coil for moisture protection and extending between the two spaced legs, said housing having a projection extending from said housing, said projection having means for attachment to a device, said housing having an opening extending through said projection directly to below the two spaced core ends of the flux core for receiving a valve assembly, said valve assembly having a valve body positioned in said opening spaced from said two spaced core ends, said valve body having an exit passage and an inlet passage extending therethrough to said opening, a valve closure member biased to close said exit passage and a moveable core piece connected to said valve closure member for acting on said valve closure member to open said exit passage when said moveable core piece is drawn to said magnetic flux core, said U-shaped magnetic flux core has one side of the U-shape longer than the other side to engage the end of said moveable core when it is against said U-shaped magnetic flux core, said longer side of the U-shape being exposed to receive the end of said moveable core.

13. A magnetic actuator as set forth in claim 12 wherein said moveable core piece has a length extending between said spaced core ends, and a thickness equal to that of the magnetic flux core, said longer side of the U-shape extending for the thickness of the moveable core piece.

14. A magnetic actuator for a valve assembly including a housing, said housing enclosing an electric coil and a magnetic flux core, said magnetic flux core being U-shaped and having two spaced legs, each leg having a core end, said core ends being spaced apart, said U-shape having a continuous length, said housing completely encapsulating said electric coil for moisture protection and extending between the two spaced legs, said housing having a projection extending from said housing, said projections having means for attachment to a device, said housing having an opening extending through said projection directly to below the two spaced core ends of the flux core for receiving a valve assembly, said valve assembly having a valve body positioned in said opening spaced from said two spaced core ends, said valve body having an exit passage and an inlet passage extending therethrough to said opening, a valve closure member biased to close said exit passage and a moveable core piece connected to said valve closure member for acting on said valve closure member to open said exit passage when said moveable core piece is drawn to said magnetic flux core, said valve closure member is a leaf spring, said exit passage having an entrance to said opening, said leaf spring having a first part covering the entrance, said leaf spring having a second part turned down to be received between said valve body and the side of said opening to place the first part in a position biased against said entrance closing it.

15. A magnetic actuator as set forth in claim 14 wherein said moveable core piece is connected to the first part of said leaf spring to pull it towards said magnetic flux core for opening said entrance to said exit passage.

16. A magnetic actuator as set forth in claim 14 wherein said opening has spaced ribs on the inside to receive the turned down part of said leaf spring to position it.

17. A magnetic actuator as set forth in claim 15 wherein the first part of said leaf spring connected to said moveable core piece is angled downwardly to angle the moveable core piece upwardly so that it will contact one leg of said magnetic flux core when said entrance to said exit passage is closed.

18. A magnetic actuator for a valve assembly including a housing, said housing enclosing an electric coil and a magnetic flux core, said magnetic flux core being U-shaped and having two spaced legs, each leg having a core end, said core ends being spaced apart, said U-shape having a continuous length, one leg of said magnetic flux core extending through said coil, the other leg of said magnetic flux core extending along the outside of said coil, said housing completely encapsulating said electric coil for moisture protection and extending between the two spaced legs, a projection extending from said housing, said projection having means for attachment to a device, said housing having an opening extending through said projection directly to a closed end adjacent said core ends of the magnetic flux core for receiving a moveable core piece and valve assembly.

19. A magnetic actuator as set forth in claim 18 wherein only said two spaced core ends are exposed.

20. A magnetic actuator as set forth in claim 18 wherein the lower part of said opening is cylindrical to slideably receive a cylindrical valve body.

21. A magnetic actuator for a valve assembly including a housing, said housing enclosing an electric coil and a magnetic flux core, said magnetic flux core being U-shaped and having two spaced legs, each leg having a core end, said core ends being spaced apart, one leg of said magnetic flux core extending through said coil, the other leg of said magnetic flux core extending along the outside of said coil, said housing completely encapsulating said electric coil for moisture protection and extending between the two spaced legs, a projection extending from said encapsulating housing, said projection having means for attachment to a device, said housing having an opening extending into said projection directly to a closed end adjacent said core ends of the magnetic flux core for receiving a valve assembly, said U-shaped magnetic flux core has one leg of the U-shape longer than the other leg, said longer leg extending down in the housing and having the side of the leg exposed to the side of the opening so that a short bar of magnetic material inserted in said opening can contact the end of one leg and the side of the other for forming a moveable core piece.

22. A magnetic actuator as set forth in claim 21 including a moveable core piece in said opening and a valve body inserted in said opening forming a valve assembly with said moveable core piece.

23. A magnetic actuator for a valve assembly including a housing, said housing enclosing an electric coil and a magnetic flux core, said magnetic flux core being U-shaped and having two spaced legs, each leg having a core end, said core ends being spaced apart, one leg of said magnetic flux core extending through said coil, the other leg of said magnetic flux core extending along the outside of said coil, said housing completely encapsulating said electric coil for moisture protection and extending between the two spaced legs, a projection extending from said encapsulating housing, said projection having means for attachment to a device, said housing having an opening extending into said projection directly to a closed end adjacent said core ends of said two spaced leg of the magnetic flux core for receiving a valve assembly, a passage extends through said housing to said opening, said passage entering said opening in the housing extending between the two spaced legs.

24. A magnetic actuator for a valve including a unitary housing, said housing being formed of a non-magnetic material and having an electric coil, a curved magnetic flux core having two legs, one leg of which extends through the coil and the other leg extends down the outside of the coil, said curved magnetic flux core having two core ends ending at the same length, said housing having an elongated opening extending away from said two core ends to the exterior of the housing, a magnetically responsive moveable valve closure means located in said elongated opening, said elongated opening extending into a cylindrical projection on said housing, said projection having external threads for attachment to a flow control valve, said flow control valve having a valve dump control port, said valve closure means closing said valve dump control port, said magnetically responsive moveable valve closure means causing said valve closure means to be displaced to control a flow of fluid through said dump port.

25. A combination as set forth in claim 24 wherein a valve dump control port is threadably attached to said external threads of said projection, spring means biasing said magnetically responsive moveable valve closure means against said valve dump control port to close it, said magnetically responsive moveable valve closure means being moved toward said flux core ends when said coil is energized to open said valve dump control port.

26. A magnetic actuator for a valve including a housing, said housing enclosing an electric coil and a magnetic flux core, said magnetic flux core having two spaced legs, each leg having a core end, said core ends being spaced apart, one leg of said magnetic flux core extending through said coil, the other leg of said magnetic flux core extending along the outside of said coil, said housing completely encapsulating said electric coil for moisture protection, a projection extending from said housing, said projection having means for attachment to a device, said housing having an open in extending into said projection directly to a closed end adjacent said core ends of the magnetic flux core for receiving a moveable core piece, a moveable core piece located in said opening under said two core ends, a valve seat positioned below said moveable core piece, said moveable core piece causing said valve seat to be open to flow when said moveable core piece is pulled towards said two core ends, wherein said valve seat has a valve closure means and said moveable core piece includes a lost motion connection to the valve closure means so that the moveable core piece is moving towards the magnetically energized core ends prior to starting to lift the valve closure means.

27. A magnetically actuated valve including a housing, said housing having an electric coil, a magnetic flux core extending through the coil, said magnetic flux core having two core ends, said housing having an elongated opening extending outwardly from said two core ends, an insertable valve body in said elongated opening spaced from said two core ends, an exit passage and an inlet passage extending through said body, a cooperating valve closure member which includes a moveable core piece located in said opening, said moveable core piece being attached to said valve closure member for moving said valve closure member to an open position, said magnetic flux core is U-shaped, said moveable core piece having two end surfaces, and said U-shaped magnetic flux core has one side of said U-shape longer than the other to form a flux path with one end surface of said moveable core piece when said moveable core piece has moved said valve closure member to an open position.

28. A magnetically actuated valve including an integral housing, said housing having an electric coil, a magnetic flux core extending through the coil, said magnetic flux core having two core ends, said housing having an elongated opening extending outwardly from said two core ends to the exterior of said housing, a valve body fixedly positioned in said elongated opening spaced from said two core ends forming an enclosed opening, an exit passage and an inlet passage extending through said body, a cooperating valve closure member positioned in said enclosed opening under said two core ends, a moveable core piece located in said enclosed opening cooperates with said exit passage to close it, said moveable core piece being attached to said valve closure member for moving said valve closure member to a position by said magnetic flux core opening said exit passage, said magnetic flux core is U-shaped, said moveable core piece having two end faces, and said U-shaped magnetic flux core has one side of said U-shape longer than the other to attract one end face of said moveable core piece when said moveable core piece is attracted to said U-shaped magnetic flux core.

29. A magnetic actuator for a valve assembly including a housing, said housing enclosing an electric coil and a magnetic flux core, said magnetic flux core being U-shaped and having two spaced legs, each leg having a core end, said core ends being spaced apart, said housing completely encapsulating said electric coil for moisture protection and extending between the two spaced legs, said housing having a projection extending from said housing, said projection having means for attachment to a device, said housing having an opening extending through said projection from the exterior of said housing directly to below the two spaced core ends of the flux core, said opening containing a valve assembly, said valve assembly having a valve body positioned in said opening spaced from said two spaced core ends forming an enclosed opening, said valve body having an exit passage and an inlet passage extending therethrough to said enclosed opening, a valve closure member in said enclosed opening is biased to close said exit passage and a moveable core piece in said enclosed opening is connected to said valve closure member for acting on said valve closure member to open said exit passage when said moveable core piece is drawn to said magnetic flux core, wherein said exit passage is aligned with the housing extending between the two spaced legs, said housing having an inlet passage, said housing inlet passage being connected to said enclosed opening, said housing inlet passage entering said enclosed opening in the housing extending between the two spaced legs.

30. A magnetically actuated valve including a housing, said housing having an electric coil, a magnetic flux core extending through the coil, said magnetic flux core having two spaced core ends, said housing having an elongated opening extending outwardly from said two core ends to the exterior of the housing, said housing extending between said two spaced core ends, an insertable valve body being slideably positioned in said elongated opening spaced from said two core ends forming an enclosed opening, an exit passage and an inlet passage extending through said valve body from the exterior of the housing to said enclosed opening, a valve closure member positioned in said enclosed opening below said two core ends for cooperating with said exit passage a moveable core piece located in said opening, said moveable core piece being attached to said valve closure member for moving said valve closure member to an open position, said exit passage in said valve body being aligned with the housing between said two core ends.

31. A magnetically actuated valve as set forth in claim 30 wherein said housing has an inlet passage, said housing inlet passage being connected to said enclosed opening, said housing inlet passage entering said enclosed opening in the housing extending between said two spaced core ends.

32. A magnetically actuated valve as set forth in claim 31 wherein said valve closure member is also positioned to cooperate with said housing inlet passage to close said housing inlet passage when said exit passage is opened.

33. A magnetically actuated valve including a housing, said housing having an electric coil, a magnetic flux core extending through the coil, said magnetic flux core having two spaced core ends, said housing having an elongated opening extending outwardly from said two core ends to the exterior of the housing, said housing extending between said two spaced core ends, an insertable valve body being slideably positioned in said elongated opening spaced from said two core ends forming an enclosed opening, an exit passage and an inlet passage extending through said valve body from the exterior of the housing to said enclosed opening, a valve closure member positioned in said enclosed opening below said two core ends for cooperating with said exit passage, a moveable core piece located in said opening, said moveable core piece being attached to said valve closure member for moving said valve closure member to an open position, a collection groove in the bottom surface of the valve body, said inlet passage being connected to said collection groove for receiving a fluid entering said magnetically actuated valve.

* * * * *